United States Patent [19]

Hirano et al.

[11] Patent Number: 4,694,393
[45] Date of Patent: Sep. 15, 1987

[54] PERIPHERAL UNIT FOR A MICROPROCESSOR SYSTEM

[75] Inventors: Takaaki Hirano, Nara; Setsufumi Kamuro, Yamatokoriyama; Akira Yamaguchi, Nara; Junichi Tanimoto, Tenri; Mikiro Okada, Nara, all of Japan

[73] Assignee: Sharp Kabushiki Kaisha, Osaka, Japan

[21] Appl. No.: 619,302

[22] Filed: Jun. 11, 1984

[30] Foreign Application Priority Data

Jun. 14, 1983 [JP] Japan .................... 58-107215
Jun. 15, 1983 [JP] Japan .................... 58-108279

[51] Int. Cl.$^4$ .................................... G06F 1/04
[52] U.S. Cl. .................................... 364/200
[58] Field of Search ... 364/200 MS File, 900 MS File

[56] References Cited

U.S. PATENT DOCUMENTS 4,041,471 8/1977 Krossa et al. .................... 364/200

OTHER PUBLICATIONS

Hill et al, "Digital Systems: Hardware Organization and Design", 2nd edition, copyright 1978, pp. 354–355.

*Primary Examiner*—Thomas M. Heckler
*Attorney, Agent, or Firm*—Birch, Stewart Kolasch & Birch

[57] ABSTRACT

A peripheral unit for a microprocessor system connected to a microprocessor comprises means for selecting whether an operation of the peripheral unit is to be halted in response to an inputted signal, and means for prohibiting the supply of a signal for activating the peripheral unit in response to the output of the selecting means. The peripheral unit, further, comprises means for canceling the operation of the prohibiting means to supply the signal for activating the peripheral unit in response to a second inputted signal. The peripheral unit and the microprocessor are constructed of CMOS transistors.

7 Claims, 3 Drawing Figures

PERIPHERAL UNIT FOR A MICROPROCESSOR SYSTEM

BACKGROUND OF THE INVENTION

The present invention relates to a peripheral unit for a microprocessor system and, more particularly, to a peripheral unit which halts its operation and cancels the halt of its operation in response to the output of a microprocessor or external circuits.

FIG. 1 shows a block diagram of a conventional microprocessor system which is widely used.

A microprocessor (which is called a "CPU" below) as a main element in the microprocessor system is connected to memories or peripheral units via a data bus, an address bus, and a control bus. Recently, battery driving apparatus or many kinds of peripheral apparatus for a portable computer have been developed. In view of the construction or characteristics of the above apparatus, each of the apparatus is required to consume a little power, so that the microprocessor system is attempted to be constructed of CMOS (Complementary Metal Oxide Semiconductor) transistors.

The power consumption in the circuit constructed of the CMOS transistors is small. However, the current to be consumed in the activated condition is about 1,000–10,000 times as large as the current to be consumed in the non-activated condition. The power consumption of the microprocessor system may be reduced by increasing a non-activate period and by decreasing an activated period to decrease unnecessary power consumption.

However, in the conventional microprocessor system, even when the microprocessor system is constructed of CMOS transistors, the peripheral units are kept in the operative condition, so that the power consumption of each of the peripheral units cannot be reduced.

SUMMARY OF THE INVENTION

Accordingly, it is an object of the present invention to provide an improved peripheral unit for a microprocessor system which consumes very little power.

It is another object of the present invention to provide an improved peripheral unit for a microprocessor system which is controlled to operate in response to the output of a microprocessor or external circuits.

It is still another object of the present invention to provide an improved peripheral unit for a microprocessor system which controls an operating period and a non-operating period for consuming very little power.

It is a further object of the present invention to provide an improved peripheral unit in a microprocessor system in which the peripheral unit is connected to a CPU (Central Processing Unit), which controls an activated period and a non-activated period of the peripheral unit by halting the operation of the peripheral unit or by canceling the halt of the operation of the peripheral unit.

It is a further object of the present invention to provide an improved peripheral unit for a microprocessor system constructed of CMOS transistors which halts the operation of the peripheral unit and cancels the halt of the operation of the peripheral unit.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a peripheral unit for a microprocessor system connected to a microprocessor comprises means for selecting whether an operation of the peripheral unit is halted in response to an inputted signal, and means for prohibiting the supply of a signal for activating the peripheral unit in response to the output of the selecting means. The peripheral unit, further, comprises means for canceling the operation of said prohibiting means to supply of the signal for activating the peripheral unit in response to a second inputted signal.

The peripheral unit and the microprocessor are constructed of CMOS transistors. The signal for activating the peripheral unit is a clock signal.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

In the present invention an example of, a peripheral unit connected to a microprocessor (CPU) via various busses in a microprocessor system is a PIO (Parallel Input/Output Controller), a CTC (Count Timer Circuit), a SIO (Serial Input/Output Controller), a DMA (Direct Memory Access Controller), or a control circuit for connecting the CPU to a terminal device such as a CRT (Cathode Ray Tube) and a floppy disk, or the like.

Figure 1:
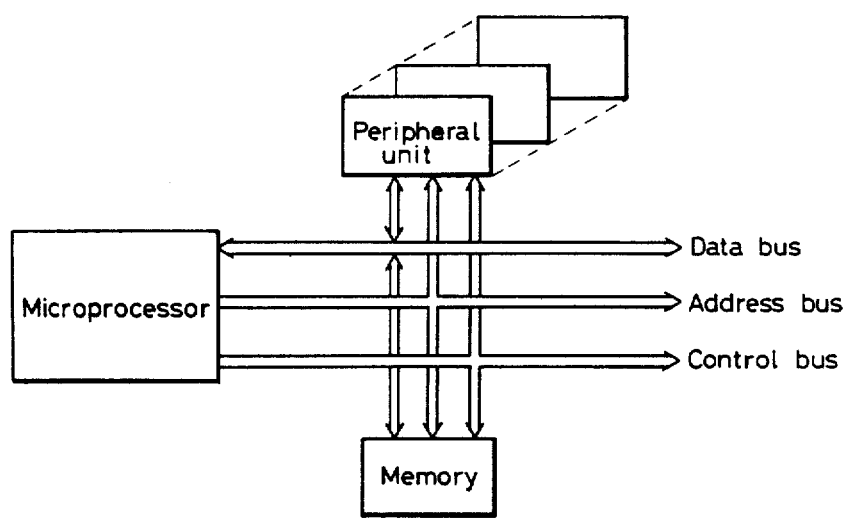
FIG. 1 shows a block diagram of a conventional microprocessor system.
Figure 2:
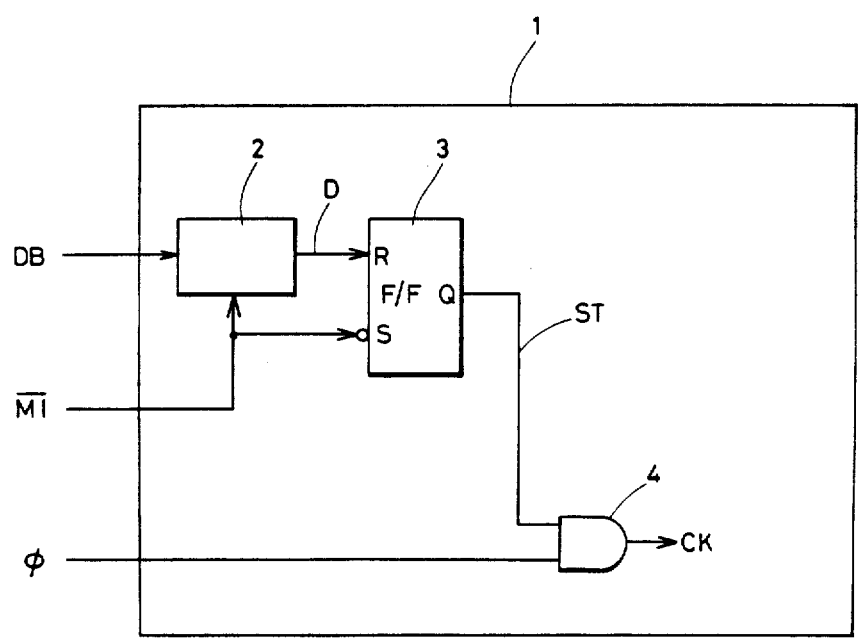
FIG. 2 shows a block diagram of a peripheral unit for a microprocessor system according to an embodiment of the present invention.

FIG. 2 shows a block diagram of a peripheral unit for a microprocessor system according to an embodiment of the present invention.

A peripheral unit 1 comprises an instruction reading means 2, a flip-flop 3, and an AND gate 4. The peripheral unit 1 is connected to the CPU or external circuits via data bus, an address bus, and a control bus.

The peripheral unit 1 of the embodiment of the present invention is constructed in the same manner as the CPU using CMOS transistors, and is activated by synchronization with a clock signal. For example, the peripheral unit 1 is set in an operable condition by using a clock signal $\phi$ applied from the CPU or the external circuits as an inner clock signal CK of the peripheral unit 1. Accordingly, when the clock signal $\phi$ applied to the peripheral unit 1 is stopped, the peripheral unit 1 stops operating. When the clock signal $\phi$ as the inner clock signal CK of the peripheral unit 1 is re-applied from the CPU or the external circuits to the peripheral unit 1 during the non-operating period, the peripheral unit 1 is re-activated.

The construction and operation for halting the activity of the peripheral unit 1 will be described with reference to FIG. 2.

As some instruction read out from a memory to the CPU is transmitted via the data bus DB, the instruction is also applied to the peripheral unit 1 connected to the data bus DB in common. The peripheral unit 1 is provided with the instruction reading means 2 for inputting information from the data bus DB and reading or encoding the contents of the information.

The instruction reading means 2 is activated to read the instruction transmitted on the data bus DB by receiving an instruction read-out signal M1 controlling an instruction read-out timing of the instruction reading means 2. The instruction read-out signal M1 is outputted from the CPU. When the instruction read-out signal M1 is a "0" level signal, it indicates that the instruction read-out cycle is being carried out.

The instruction reading means 2 encodes the instruction on the data bus DB when the instruction read-out signal $\overline{M1}$ is the "0" level signal, and is operated to output a certain signal in response to the instruction.

Each of the output signals from the instruction reading means 2 in response to the instruction inputted from the data bus DB is applied to each of the circuits in the peripheral unit 1.

In the case where the signal from the data bus DB is an instruction for halting the operation of the peripheral unit 1, the instruction reading means 2 detects the signal as the operation halt instruction and outputs an output D of a "1" level signal for selecting the operation halt of the peripheral unit 1.

The flip-flop 3 is provided for continuing a period of the operation halt mode of the peripheral unit 1, and has a reset terminal and a set terminal. An inverter is provided at the set terminal of the flip-flop 3 and inverts the instruction read-out signal $\overline{M1}$.

The output signal D from the instruction reading means 2 is inputted into the reset terminal of the flip-flop 3, and the signal inverting the instruction read-out signal $\overline{M1}$ by the inverter is inputted into the set terminal of the flip-flop 3. When the instruction from the data bus DB is the instruction for halting the operation of the peripheral unit 1, the flip-flop 3 is reset because the input of the output signal D of the "1" level signal into the reset terminal of the flip-flop 3 is slightly delayed from the input of the signal "1" inverting the instruction read-out signal $\overline{M1}$ of the "0" level signal into the reset terminal of the flip-flop 3, and the flip-flop 3 outputs an inner control signal ST of the "0" level signal.

The inner control signal ST is inputted into one input terminal of the AND gate 4, and the clock signal $\phi$ applied from the CPU is inputted into the other input terminal of the AND gate 4. The inner control signal ST controls whether the clock signal $\phi$ passes the AND gate 4 as the inner clock signal CK of the peripheral unit 1. The peripheral unit 1 is activated by applying the inner clock signal CK. If the inner control signal ST is the "0" level signal, the clock signal $\phi$ cannot pass the AND gate 4. When the inner control signal ST is the "1" level signal, the output from the AND gate 4 is applied to the circuits within the peripheral unit 1 as the inner clock signal CK. Accordingly, when the operation halt mode is selected by applying the inner control signal ST of the "0" level signal, the inner clock signal CK is not generated even when the clock signal $\phi$ from the CPU is applied to the peripheral unit 1, and is set in the operation halt mode and the peripheral unit 1 is not activated, so that the instruction from the data bus DB is read and the operation halt is carried out by the peripheral unit itself.

The operation of the peripheral unit 1 for canceling the above operation halt mode will be described with reference to FIG. 2.

The inverter is provided at the set terminal of the flip-flop 3, and the signal inverting the instruction read-out signal $\overline{M1}$ by the inverter is applied to the set terminal of the flip-flop 3 to change the reset state of the flip-flop 3 to the set state.

In the case where both the CPU and the peripheral unit 1 are in the operation halt mode at the same time, the CPU cancels its operation halt mode by some manner and is re-operated by fetching the next instruction, and the CPU subsequently outputs the instruction read-out signal $\overline{M1}$ of the "0" level signal. In the peripheral unit 1, the instruction read-out signal $\overline{M1}$ is applied to the instruction reading means 2 and the signal inverting the instruction read-out signal $\overline{M1}$ is applied to the set terminal of the flip-flop 3. As some instruction from the data bus DB which is not the operation halt instruction is applied to the instruction reading means 2, the instruction reading means 2 outputs the output signal D of the "0" level signal into the reset terminal of the flip-flop 3. The output signal D of the "0" level signal and the inverted signal of the "1" level signal are inputted into the reset and set terminals of the flip-flop 3, respectively, so that the flip-flop 3 is set and outputs the inner control signal ST of the "1" level signal because the instruction from the data bus DB is not the operation halt instruction.

Accordingly, the clock signal $\phi$ is passed through the AND gate 4 by applying the inner control signal ST of the "1" level signal, and the clock signal $\phi$ as the inner clock signal CK is applied to the circuits within the peripheral unit 1 so as to activate the peripheral unit 1.

As described above, the operation for canceling the operation halt mode of the peripheral unit 1 is carried out.

In the construction of the embodiment of the present invention, a specific terminal for canceling the operation halt of the peripheral unit is not required. The CPU does not carry out any specific operation for canceling the operation halt mode of the peripheral unit 1, and the operation halt mode of the peripheral unit 1 is automatically canceled by fetching the first instruction by the CPU after the CPU is reoperated, so that only the CPU must be reoperated so as to reoperate the microprocessor system.

In a further embodiment of the present invention, if desired, the peripheral unit may be provided with a specific terminal for inputting the operation halt instruction, so that the flip-flop may be controlled in response to the input signal of the specific operation halt terminal.

In place of the instruction reading signal $\overline{M1}$, a read signal $\overline{RD}$, an Input/Output request signal $\overline{IORQ}$, or the like may be used for canceling the operation halt mode of the peripheral unit.

Figure 3:
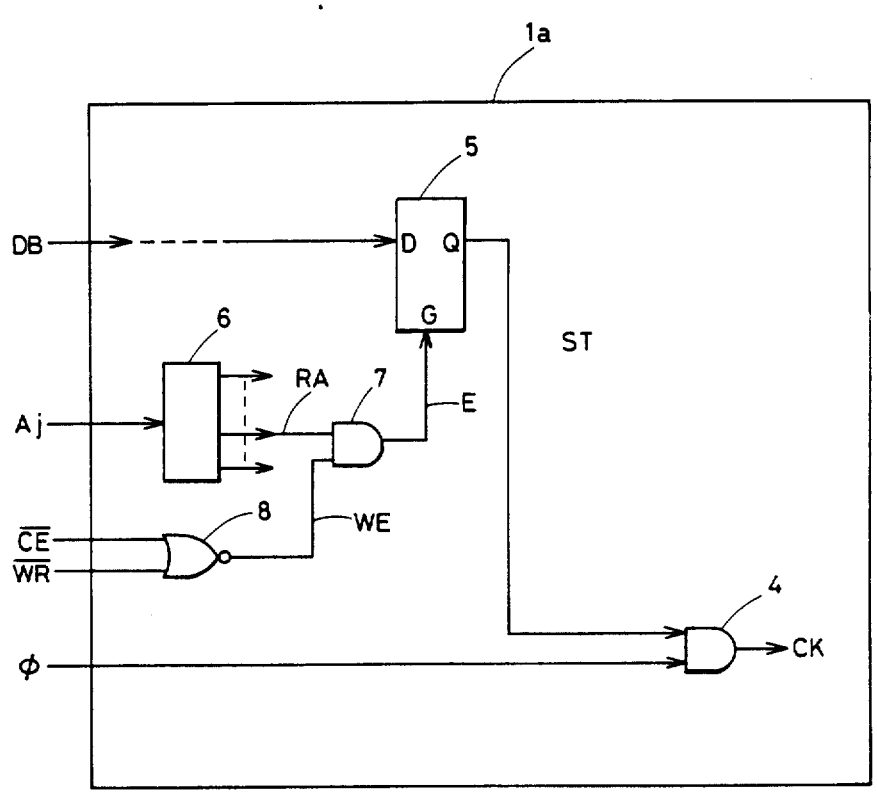
FIG. 3 shows a block diagram of a peripheral unit for a microprocessor system according to another embodiment of the present invention.

FIG. 3 shows a block diagram of a peripheral unit for a microprocessor system according to still another embodiment of the present invention.

A peripheral unit 1a comprises a register 5, an address decoder 6, AND gates 4 and 7, and a NOR gate 8.

In this embodiment of the present invention, the operation of the peripheral unit 1a is halted, and the operation halt is canceled, by using the register 5.

The register 5 stores bit data "0" or "1" for setting the operation halt mode or canceling the operation halt mode selected from the information on the data bus DB.

When the operation of the peripheral unit 1a is halted, the register 5 stores a "0" level signal for setting the operation halt mode from the information on the data bus DB, and an output E of a "1" level signal of the AND gate 7 is inputted into the register 5, so that the register 5 outputs an inner control signal ST of a "0" level signal.

The inner control signal ST of the "0" level signal outputted from the register 5 is inputted into the AND gate 4, so that the clock signal $\phi$ applied from the CPU does not pass the AND gate 4 and the inner clock signal CK fo activating the peripheral unit 1a is not generated. The operation of the peripheral unit 1a is stopped and the peripheral unit 1a is set in the operation halt mode.

In this case, the address decoder 6 outputs an address signal RA of the "1" level signal for selecting the register 5 from various registers within the peripheral unit 1a. A chip-enable signal $\overline{CE}$ and a writing signal $\overline{WR}$ are applied to the NOR gate 8. When both the chip-enable signal $\overline{CE}$ and the writing signal $\overline{WR}$ are developed (in the "0" level signal), the NOR gate 8 outputs the output signal WE of the "1" level signal as the writing signal of the register 5. The address signal RA of the "1" level signal and the output signal WE of the "1" level signal of the NOR gate 8 are inputted into the AND gate 7, and the AND gate 7 outputs the output signal E of the "1" level signal.

During the operation halt mode of the peripheral unit 1a, when the peripheral unit 1a is re-operated, the signal "1" for canceling the operation halt mode is stored into the register 5 from the data bus DB, and the chip enable signal $\overline{CE}$ of the "1" level signal and the writing signal $\overline{WR}$ of the "0" level signal are inputted into the NOR gate 8 and the NOR gate 8 outputs the output signal WE of the "1" level signal.

The address decoder 6 selects the register 5 from the various registers within the peripheral unit 1a, and the address decoder 6 outputs the address signal RA of the "1" level signal.

The output signal WE of the "1" level signal and the address signal RA of the "1" level signal are inputted into the AND gate 7, and the AND gagte 7 outputs the output signal E of the "1" level signal. When the output signal E of the "1" level signal from the AND gate 7 is inputted into the register 5, the register 5 outputs the inner control signal ST of the "1" level signal, so that the clock signal $\phi$ passes the AND gate 4 and the clock signal $\phi$ as the inner clock signal CK is applied to the inner circuits within the peripheral unit 1a. Accordingly, the operation halt mode of the peripheral unit 1a is canceled.

In a yet another embodiment of the present invention, if desired, the peripheral unit may be provided with a specific terminal for inputting the operation halt instruction. In the case where the peripheral unit is provided with the specific terminal for inputting the operation halt instruction, the operation halt mode may be canceled by controlling the register for setting the operation halt mode.

The operation halt instruction applied on the data bus DB may be applied to only the peripheral unit, or to the CPU and other peripheral units at the same time.

According to the present invention, because both the CPU and the peripheral unit are constructed of CMOS transistors, it is useful to stop the inner clock signal activating the peripheral unit when the unit is not needed for consuming very little power. The power consumption of the CMOS circuit occurs when the signal is inverted. Therefore, if the clock signal, which is inverted quickly, is stopped, it consumes a very little power.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A peripheral unit for a microprocessor system including a microprocessor, comprising:
   means, responsive to a halt-operation instruction from the microprocessor, for outputting a halt-operation signal;
   means, responsive to an activation signal from the microprocessor, for producing an internal clock signal for activating said peripheral unit; and
   means, responsive to said halt-operation signal, for inhibiting the production of said internal clock signal.

2. The peripheral unit of claim 1, wherein said means responsive to said halt-operation signal further comprises means, responsive to a read-out signal from the microprocessor, for reenabling the production of said internal clock signal.

3. The peripheral unit of claim 1, wherein the peripheral unit and the microprocessor are constructed of CMOS transistors.

4. The peripheral unit of claim 1, wherein the activation signal from the microprocessor for activating the peripheral unit is a clock signal.

5. The peripheral unit of claim 1, wherein said means responsive to said halt-operation signal is a register or a flip-flop.

6. The peripheral unit of claim 1, wherein said means for producing an internal clock signal is a gate circuit.

7. The peripheral unit of claim 1, wherein said means for producing an internal clock signal is an AND gate.

* * * * *